(No Model.) 3 Sheets—Sheet 1.
W. H. MORGAN.
OVERHEAD TRAVELING CRANE.
No. 564,708. Patented July 28, 1896.
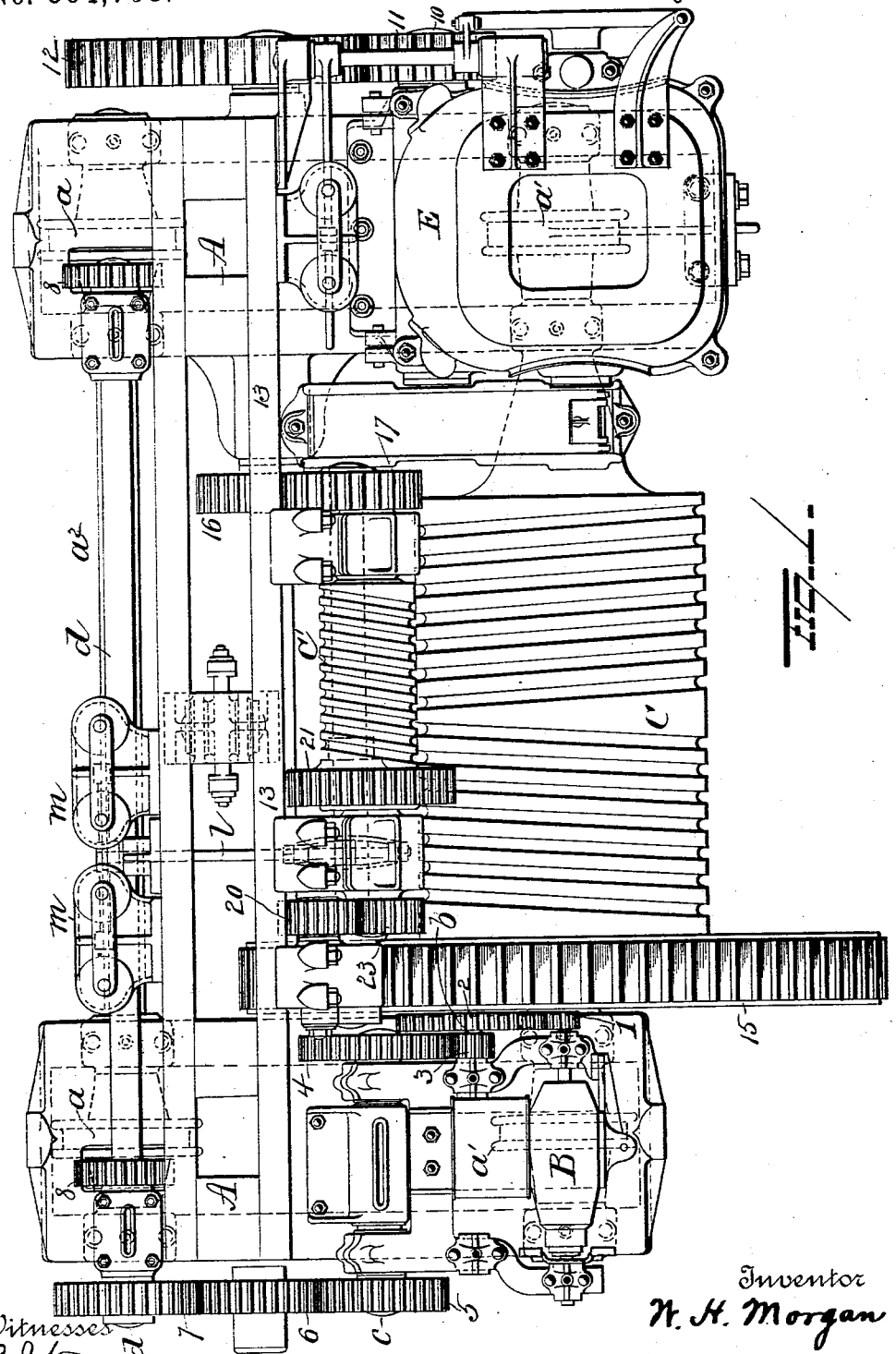
Witnesses
E. N. Nottingham
G. F. Downing
Inventor
W. H. Morgan
By H. A. Seymour
Attorney

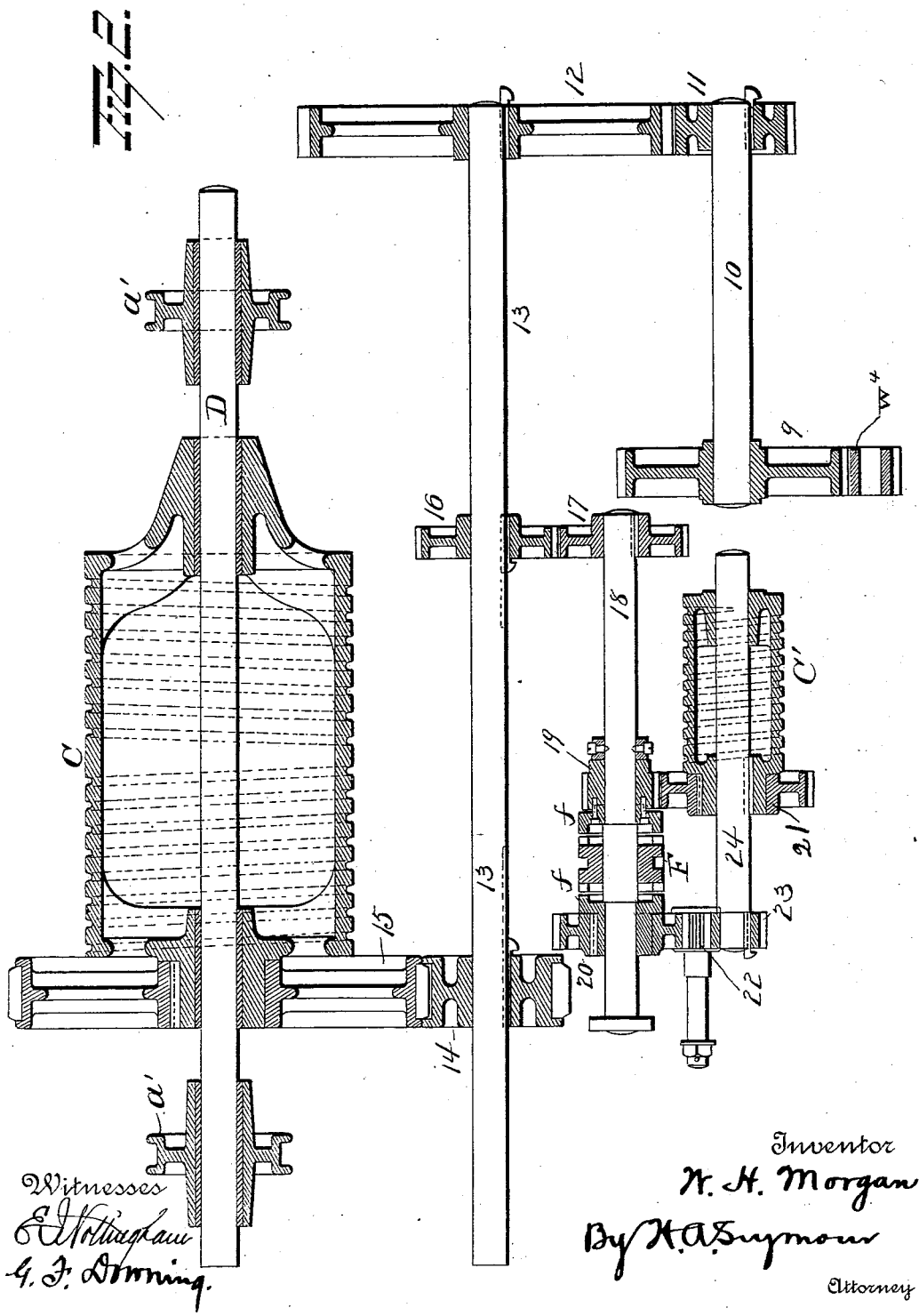

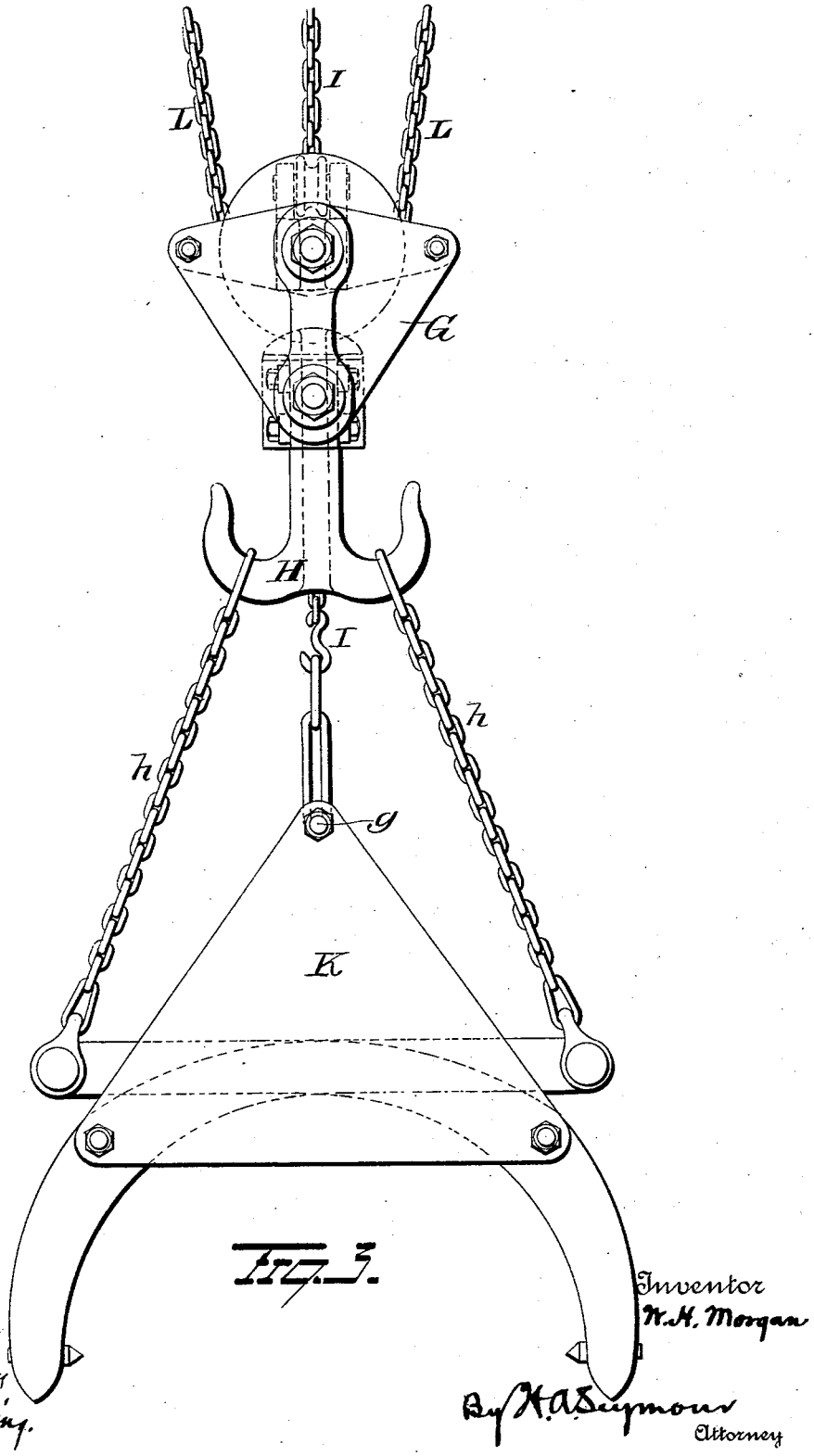

UNITED STATES PATENT OFFICE.

WILLIAM HENRY MORGAN, OF ALLIANCE, OHIO, ASSIGNOR OF THREE-FOURTHS TO THOMAS R. MORGAN, SR., THOMAS R. MORGAN, JR., AND JOHN R. MORGAN, OF SAME PLACE.

OVERHEAD TRAVELING CRANE.

SPECIFICATION forming part of Letters Patent No. 564,708, dated July 28, 1896.

Application filed July 7, 1893. Serial No. 479,795. (No model.)

*To all whom it may concern:*

Be it known that I, WILLIAM HENRY MORGAN, of Alliance, in the county of Stark and State of Ohio, have invented certain new and useful Improvements in Overhead Traveling Cranes; and I do hereby declare the following to be a full, clear, and exact description of the invention, such as will enable others skilled in the art to which it appertains to make and use the same.

My invention relates to an improvement in overhead traveling cranes, and particularly to mechanism employed for releasing and operating grappling-hooks, tilting ladles, &c., carried by the crane; and it consists in a trolley having two drums actuated by a single motor, one drum carrying the hoisting-chain and the other the releasing or tilting chain, and means for rotating said drums in the same or in opposite directions.

My invention further consists in the parts and combinations of parts, as will be more fully described, and pointed out in the claims.

In the accompanying drawings, Figure 1 is a view in plan of a trolley embodying my invention. Fig. 2 is a diagrammatic representation of the two drums, showing the gearing for actuating them; and Fig. 3 is a view of grappling-tongs and chains.

A represents a trolley, consisting, essentially, of a frame of any preferred construction mounted on axles carrying flanged track-wheels $a\ a'$. These track-wheels $a\ a'$ move on rails secured on the upper surface of a traveling bridge, which latter is not shown and which may be of any desired construction.

The wheels $a$ are secured on shaft $a^2$ and are actuated by motor B through the intervention of the following gearing: Secured on the armature-shaft of the motor is the pinion 1, which latter meshes with toothed wheel 2, fast on shaft $b$. This shaft $b$ carries pinion 3, which meshes with toothed wheel 4, fast on one end of axle $c$. Secured to the opposite end of axle $c$ is the wheel 5, which engages idler 6, meshing with wheel 7, fast on shaft $d$. This shaft extends crosswise the trolley or at right angles to the direction of travel of the trolley and is provided near its opposite ends with pinions 8, each of which meshes with a pinion fast on shaft $a^2$ or secured to the flanged wheels $a$.

The main drum C is mounted on the drum and trolley-axle D, which latter can be rigidly secured to the frame of the trolley with the drum C and flanged wheels $a'$ loose thereon, or it can be journaled at its ends in bearings on the trolley-frame with the drum and flanged wheels loose thereon, or it may be loosely mounted in bearings with the drum keyed thereto and the flanged wheels loose, or it can be loosely mounted with the drum loose thereon and the flanged wheels keyed.

It is essential that the flanged wheels $a'$ should be free to move independently of the drum C, otherwise the rotation of the drum would rotate the wheels $a$ and cause the trolley to travel as the drum rotates. This drum C, together with the auxiliary drum C', is actuated in unison or the main drum actuated independently of the auxiliary drum C' by the electric motor E (shown in Fig. 1) and the following gearing, which is more clearly illustrated in the diagrammatic view, Fig. 2.

On the armature-shaft of the motor is secured pinion $w^4$, which latter meshes with toothed wheel 9, fast on shaft 10. This shaft 10 carries at its opposite end pinion 11, which drives the master-wheel 12. This pinion 12 is on the main driving-shaft 13, carrying pinion 14, which meshes with the toothed wheel 15, fast to the main drum C. Thus it will be seen that through the mechanism last described the main drum carrying the main hoisting-chain can be rotated in either direction by changing the direction of rotation of the main shaft and thus raise or lower the block carrying the grappling-tongs.

Keyed to shaft 13 is a toothed wheel 16, which drives a similar wheel 17 on shaft 18. This shaft 18 is provided with two loose pinions 19 and 20, separated a suitable distance, and each is provided on its inner face with a clutch-section $f$, adapted to be engaged by the movable clutch-section F. When the clutch-section is standing midway between the two loose wheels 19 and 20, it is not in engagement with either. When, however, the clutch F is in engagement with either pinion 19 or 20, both drums are rotated. Pinion 19 is in direct engagement with pinion 21, fast to auxiliary drum C' and hence rotates the drum in one direction, whereas pinion 20 drives the drum C' in the opposite direction through the intervention of idle-pinion 22 and pinion 23, the latter being fast to the shaft 24, carrying the auxiliary drum. As pinion 20 is greater in diameter than pinion 19, and pinions 22 and 23 are smaller than pinion 21, it follows that when drum C' receives its motion from pinion 20 it revolves at a greater rate of speed than when driven by pinion 19. The additional speed is desirable also for quickly tripping or tipping the load carried by the main chain, and also for quickly permitting the tongs to close on an ingot while the main or hoisting chain is being elevated. In this device both drums are actuated by a single shaft, and hence the main drum is always in motion while tipping, tripping, or grasping a load. The auxiliary drum could remain at rest by disengaging clutch F from pinions 19 and 20, and thus operate to throw the weight on the trip-chain while the main chain is lowering a load and in this way trip or tilt the load; but the operation can be accomplished more quickly by reversing the direction of rotation of the auxiliary drum and by the employment of speed-changing gearing.

The main hoisting-chain L is secured to drum C and carries the hoisting-block G, having twin hooks H.

The shank of the twin or sister hook is hollow for the passage of the chain I, one end of which is attached at $g$ to the frame carrying the tongs or bell-crank levers, while the opposite end of said chain is secured to the auxiliary drum C'.

Carried by the sister hooks H are the chains $h$, each of which is connected to an arm of the bell-crank levers which form the lifting-tongs. These levers are pivoted at their elbows to the frame K, and hence when chain I is slack, so that the entire weight of frame K and the tongs falls on chains $h$, the biting ends of the tongs are closed on the object to be lifted.

Any other form of carrier may be used, the tongs being described simply as a convenient form of carrier.

The drums C and C' are geared, when both are unwinding their chains, to let out equal lengths of chain, and by reversing the direction of rotation of drum C' chain I is shortened and the weight of the frame K, tongs, and ingot is transferred from chains $h$ to chain I. The tongs are so constructed that when supported by chains $h$ they close by gravity, and the weight carried thereby exerts a closing pressure at all times. Even when the weight is at rest the tongs remain in contact therewith, and the slightest upward movement thereof, caused by direct pull on chains $h$, causes the teeth of the tongs to engage the ingot. Now by transferring the weight from the main hoisting-chain and chains $h$ to chain I, which, as before stated, is accomplished by changing the direction of rotation of drum C', the tongs are opened or separated, and consequently disengaged from the ingot or weight.

In the operation of the device the chain I, attached to frame K and actuated by the auxiliary drum C', is slightly longer, or, in other words, is more slack than the main hoisting-chain, so that the entire load is borne by the main hoisting-chain. While elevating or lowering a load the drums C and C' move in a direction to simultaneously elevate or lower their respective chains, as the case may be. When, however, the load has been carried to the point where it is to be deposited, and either after or before it has been deposited on the floor or ground, it can be released by simply shifting clutch F so as to change the direction of rotation of drum C. Thus drums C and C' may both be lowering their chains and the load, and by changing the direction of rotation of drum C' the chain on the latter will at once begin to ascend, thus transferring the weight from chains $h$ to I and, as before stated, opens the tongs and releases the load.

To attach the tongs to another ingot, the clutch is thrown so that the auxiliary drum runs in a reverse direction to the hoisting-drum, and, giving it a greater speed, enables the tongs to close before they are lifted entirely clear of the ingot. After the tongs are engaged the clutch is thrown to the opposite side. This enables the auxiliary drum to hoist its chain at the same speed and in the same direction as the main hoisting-drum. The clutch can be actuated by any of the well-known actuating devices, but I prefer to employ a rock-shaft $l$, having a yoke to engage the movable section F of the clutch, which latter can slide on but cannot rotate independently of shaft 18. The outer end of the rock-shaft is provided with a head arranged at right angles to the shaft and projecting from opposite sides of same, to the ends of which are attached cores of the solenoids $m$. By energizing one solenoid the shaft is rocked in one direction, and by energizing the other it is rocked and the clutch shifted in the opposite direction.

I have described my improvement in connection with a crane carrying ingot-tongs, but it is equally applicable for tilting ladles and other similar purposes, and the main drum can be used for purposes for which ordinary cranes are employed.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a crane, the combination with a trolley and two drums thereon, of a main shaft, a motor for actuating said shaft, positive or fixed gearing connecting the main shaft and one drum whereby the speed and direction of rotation of the drum are dependent on the speed and direction of rotation of the shaft, a clutch and loose wheels connecting the shaft and other drum, the loose wheels being of different sizes for changing the speed of the drum and a carrier operatively connected with said drums, substantially as set forth.

2. In an overhead traveling crane, the combination with a trolley adapted to travel on a traveling bridge, two drums on said trolley, and a chain carried by each drum, of a main shaft, a motor on the trolley for actuating the main driving-shaft, gearing positively connecting the main shaft and one of the drums and a reversing clutch and gearing connecting the main shaft and remaining drum, substantially as set forth.

In testimony whereof I have signed this specification in the presence of two subscribing witnesses.

WILLIAM HENRY MORGAN.

Witnesses:
H. W. HARRIS,
JOHN R. MORGAN.